Dec. 18, 1962 H. C. McDONALD, JR 3,069,628

PULSE RATE DIVIDER

Filed April 27, 1960

INVENTOR
HENRY C. McDONALD JR.

BY Roland A. Anderson
ATTORNEY

United States Patent Office 3,069,628

Patented Dec. 18, 1962

3,069,628

PULSE RATE DIVIDER

Henry C. McDonald, Jr., Livermore, Calif., assignor to the United States of America as represented by the United States Atomic Energy Commission Filed Apr. 27, 1960, Ser. No. 25,173
1 Claim. (Cl. 328—52)

The present invention relates generally to pulse rate dividers, and more particularly to a compact pulse rate divider circuit that is operable at relatively high input pulse repetition rates and has a low impedance output.

A variety of circuits are available for providing a series of output pulses at a repetition rate that is related by a fixed division factor to the repetition rate of a series of input pulses. Prominent among such conventional pulse divider circuits are blocking oscillators, multivibrators, and the like. Conventional blocking oscillators, however, are limited in the input pulse repetition rates that may be reliably divided by virtue of the relatively low frequency response to the feedback transformers employed in blocking oscillator circuits. Multivibrators of conventional design, on the other hand, are relatively complex in that they require a multiplicity of tubes having high impedance outputs and therefore in most applications must be coupled to a low impedance output circuit such as a cathode follower.

In order to overcome the foregoing limitations and disadvantages of conventional circuits for pulse division, there is provided by the present invention an improved pulse divider that is extremely compact in design and yet has a low impedance output and is operable at higher input pulse repetition rates than heretofore possible.

It is therefore an object of the present invention to provide a high repetition rate pulse division circuit that employs a single tube and has a low impedance output.

It is another object of this invention to provide a circuit for accomplishing pulse division without necessity of feedback transformer or cathode follower circuitry.

Yet another object of the invention is to provide a pulse divider circuit wherein the pulse division ratio and output pulse width may be separately varied.

A further object of the present invention is the provision of a simple, compact pulse divider with attendant low cost of construction.

Figure 1:
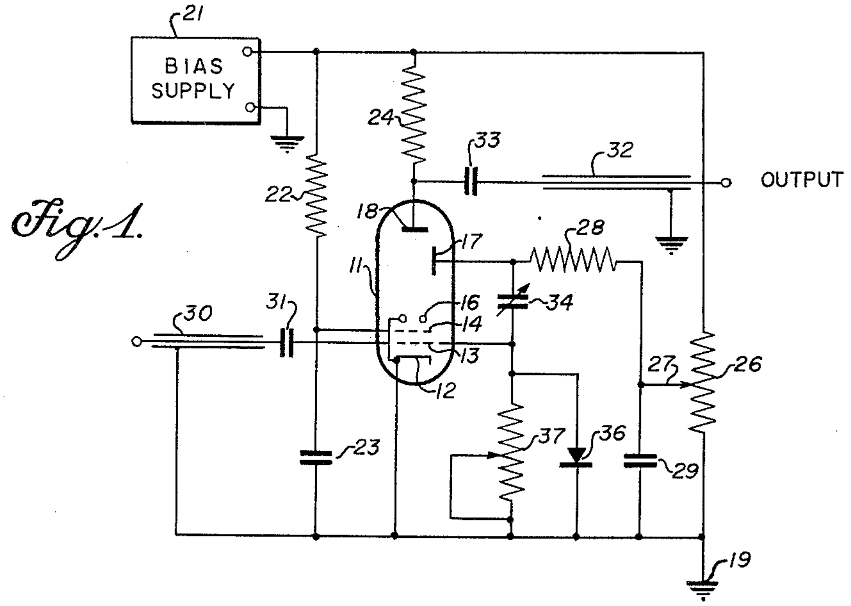
Figure 2:
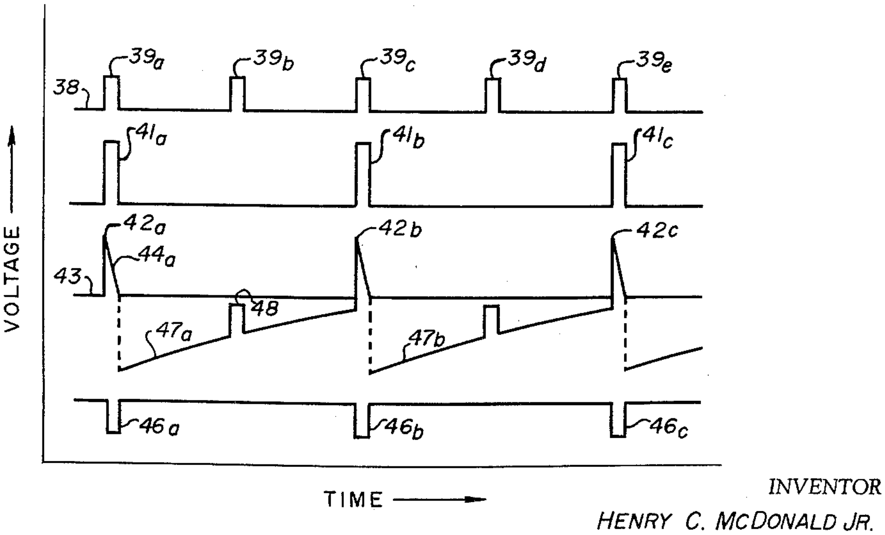

The invention, both as to its organization and method of operation, together with further objects and advantages thereof, will best be understood by reference to the following specification taken in conjunction with the accompanying drawing, of which:

FIGURE 1 is a schematic circuit diagram of a preferred embodiment of the invention; and FIGURE 2 is a graph of voltage versus time depicting pulse wave forms at various portions of the circuit during operation.

Considering now the invention in some detail and referring to the illustrated form thereof in the drawing, there is provided a pulse division circuit of novel construction that includes a tube having a secondary emission electrode, commonly termed a dynode, as the only tube in the circuit. The secondary emission tube is arranged to accomplish division of a series of pulses applied to the control grid thereof by control of the relaxation time of the tube in a unique manner to various multiples of the time between consecutive pulses. More specifically, the relaxation time of the tube is controlled by circuitry for the charging and discharging of a capacitor or equivalent storage element coupled between the dynode and control grid of the secondary emission tube. The charging and discharging circuitry includes means for rapidly charging the capacitor upon the formation of a positive pulse at the dynode in response to saturation of the tube by an incoming pulse at the control grid. Such charging of the capacitor in the positive direction at the dynode correspondingly establishes a negative going potential at the control grid that drives the tube below cutoff. Means are further included in the charging and discharging circuitry for decoupling the capacitor from its charging path simultaneously with cutoff of the tube and coupling the charged capacitor to a discharge circuit having a relatively long time constant. The discharging capacitor hence establishes an exponentially decreasing bias at the control grid that maintains the tube in a state of cutoff until the capacitor has discharged sufficiently that an incoming pulse at the control grid is able to again drive the grid above cutoff. An output pulse is produced at the anode of the tube each time an incoming pulse at the control grid drives the tube above cutoff, and the duration of each output pulse corresponds to the charging time of the capacitor. Incoming pulses, applied to the control grid during the time the negative grid bias established by the discharging capacitor is sufficiently negative that the pulses are unable to drive the tube above cutoff, do not produce output pulses at the anode. These pulses are hence lost and a dividing action is produced by the circuit. In other words, the time constant of the capacitor discharge path establishes the relaxation period of the tube. The time constant of the discharge path may be varied to in turn vary the division ratio of the circuit whereas the time constant of the charging circuit may be varied to vary the width of the output pulses. Moreover, conventional tubes having secondary emission electrodes advantageously have low impedance outputs and are operative at extremely high input pulse repetition rates.

Considering now the pulse divider of the present invention in greater detail as to the specific embodiment illustrated in the drawing, it will be noted that the tube of previous mention is best provided as a secondary emission RF pentode 11 such as a type EFP 60. The secondary emission pentode includes a cathode 12, control grid 13, screen grid 14, suppressor grid 16, dynode 17, and anode 18, the cathode and suppressor grid being connected to ground as indicated at 19. Operating bias is established at the screen grid 14, dynode 17, and anode 18 in a conventional manner as by means of a D.C. bias supply 21 coupled to the foregoing tube elements. More specifically, the negative terminal of bias supply 21 is connected to ground whereas the positive terminal is coupled through a screen bias resistor 22 to screen grid 14 and a screen decoupling capacitor 23 is connected between the screen grid and ground. A plate resistor 24 is connected between the positive terminal of the bias supply and anode 18. The connection of the dynode 17 to the bias supply is accomplished by a voltage divider 26 connected between the positive terminal of the supply and ground and having its tap 27 connected through a resistor 28 to the dynode. A decoupling capacitor 29 is in addition connected between tap 27 and ground.

Input and output to and from the divider circuit is preferably provided by coaxial lines in order to facilitate operation of the circuit at relatively high input pulse repetition rates and with a low impedance output. To these ends an input coaxial cable 30 is provided with its central conductor connected to control grid 13 through a small coupling capacitor 31 and its outer conductor connected to ground. An output coaxial cable 32 is similarly provided with its outer conductor connected to ground and its central conductor connected to one side of a coupling capacitor 33, the other side of which is connected to anode 18.

As regards the unique relaxation time control of the divider circuit, it is to be noted that the storage capacitor thereof is preferably provided as a variable capacitor 34 connected between the control grid 13 and dynode 17. Prefered means for charging capacitor 34 upon the formation of a positive pulse at the dynode comprises a diode 36 having its positive terminal connected to the juncture of the capacitor and control grid, and its negative terminal connected to ground. In addition to serving as a low resistance charging path to the capacitor 34, the diode also functions as the hereinbefore mentioned means for decoupling the capacitor from the charging path and, in effect, connecting the capacitor in the discharge circuit substantially simultaneously with cutoff of the tube. More explicitly, a variable discharge resistor 37 is paralleled with diode 36 and together with resistor 28 comprises the discharge circuit. Upon the application of a positive input pulse to control grid 13, the diode 36 is rendered conducting and the capacitor 34 is rapidly charged therethrough to substantially the potential of the positive pulse simultaneously produced at dynode 17 due to saturation of the tube. Substantially all charging current passes through the diode by virtue of its extremely low resistance during conduction compared to the resistance of discharge resistor 37. As the side of capacitor 34 connected to dynode 17 charges in the positive direction, the side of the capacitor connected to the control grid 13 and positive terminal of diode 36 correspondingly charges in the negative direction and drives the tube below cutoff while simultaneously terminating conduction through the diode. The diode thus opens the charging path to the capacitor 34 such that the charged capacitor is now decoupled therefrom and operatively in series with only the discharge circuit formed by resistors 28, 37. The capacitor 34 then discharges through resistors 28, 37 to establish the exponentially decreasing grid bias that is determinative of the relaxation period of the tube and therefore the division ratio of the circuit.

The operation of the divider circuit as arranged to divide the repetition rate of a series of input pulses by a factor of two is illustrated by the waveforms of FIG. 2. As shown therein, a pulse train 38 consisting of successive constant amplitude pulses 39 is applied through input coaxial cable 30 and coupling capacitor 31 to control grid 13. The first pulse 39*a* saturates the tube 11 to simultaneously establish a positive pulse 41*a* at the dynode 17. The pulse 41*a* is effective in rapidly charging capacitor 34 through conducting diode 36 in the manner previously described. During charging of the capacitor a differentiated pulse 42*a* is correspondingly produced at the control grid 13. The pulse 42*a* instantaneously rises vertically from cutoff as denoted by base line 43 to a magnitude substantially equal that of dynode pulse 41*a* upon saturation of the tube. As the capacitor 34 charges, however, the increasing negative charge at the control grid side of the capacitor appears as a declining trailing edge 44*a* of pulse 42*a*. When capacitor 34 is fully charged, the trailing edge 44*a* intersects base line 43, viz., the control grid potential is at cutoff and conduction through the tube is terminated. During the charging time of capacitor 34 and therefore the conduction period of the tube, an output pulse 46*a* is generated at the anode 18 and appears in output coaxial cable 32. As noted previously, the width of output pulse 46*a* is substantially equal the charging period of capacitor 34.

Simultaneously with termination of conduction in tube 11 as determined by the intersection of trailing edge 44*a* of pulse 42*a* with cutoff base line 43, conduction through diode 36 is terminated. The capacitor 34 at this time begins its discharge through resistors 28, 37 and the negative bias thereby established at the grid appears as an exponentially decreasing potential 47*a* approaching cutoff base line 43 from the negative direction. At the instant the second input pulse 39*b* is applied to control grid 13, the exponentially decreasing grid bias potential 47*a* is sufficiently below cutoff that the overall grid potential at this instant, as indicated generally at 48, is also below cutoff base line 43. The tube hence does not conduct in response to pulse 39*b* and, accordingly, no output pulse is produced. Upon the application of the third input pulse 39*c* to the control grid, however, the grid bias 47*a* has decayed sufficiently that the resultant potential at the grid is above the cutoff base line 43 and therefore the tube 11 and diode 36 are both rendered conducting. A second pulse 41*b* is correspondingly produced at the dynode at this time and a second differentiated pulse 42*b* appears at the control grid during charging of capacitor 34 in an analogous manner to that described for the pulse 42*a*. A second output pulse 46*b* is also produced in the output cable 32 during the duation of pulse 42*b* after which a second relaxation period is established by a second cycle of negative bias 47*b* at the control grid. The further operation of the circuit is thereafter identical to that previously described. The fourth incoming pulse 39*d* is lost to the circuit whereas the fifth pulse 39*e* initiates another cycle of operation resulting in the formation of dynode pulse 41*c*, differentiated pulse 42*c*, output pulse 46*c*, etc.

It is thus readily apparent that in the illustrative example depicted by the waveforms of FIG. 2, every other input pulse 39 is lost and the output pulses 46 are generated at half the repetition rate of the input pulses. Other division ratios may, of course, be established in the divider circuit merely by varying the time constant of the negative grid bias potential 44 and therefore the relaxation period of the tube. This is accomplished by varying capacitor 34, or more preferably discharge resistor 37. The longer the time constant of bias potential 44, the greater is the division ratio. In addition, the width of the output pulses 46 is variable by variation of capacitor 34. It will be appreciated that where a desired division ratio is beyond the capabilities of an individual stage of the divider circuit, a plurality of stages may be cascaded in the usual manner.

While the invention has been disclosed with respect to a single preferred embodiment, it will be apparent to those skilled in the art that numerous variations and modifications may be made within the spirit and scope of the invention and thus it is not intended to limit the invention except as defined in the following claim.

What is claimed is:

In the operation of a pulse circuit having a secondary emission vacuum tube including at least cathode control grid, dynode, and anode elements supplied with operating bias, a capacitor connected between said dynode and control grid elements, a low resistance charging path to ground connected to the juncture of said capacitor and control grid including a diode having its positive terminal coupled to said control grid and its negative terminal coupled to ground, and a discharge path connected in parallel with said charging path, the method of pulse rate division which comprises applying a series of positive pulses to be divided in pulse rate to the control grid of said secondary emission vacuum tube, adjusting the capacitance of said capacitor and resistance of said discharge path to establish a relaxation period of said tube greater than the time interval between the start and termination of adjacent ones of said pulses, and deriving pulses at a fraction of said pulse rate from said anode.

References Cited in the file of this patent

UNITED STATES PATENTS 2,509,998 Van Der Mark ---------- May 30, 1950